C. C. ROSE.
HORSE COLLAR THROAT.
APPLICATION FILED AUG. 17, 1911.
1,013,688.
Patented Jan. 2, 1912.
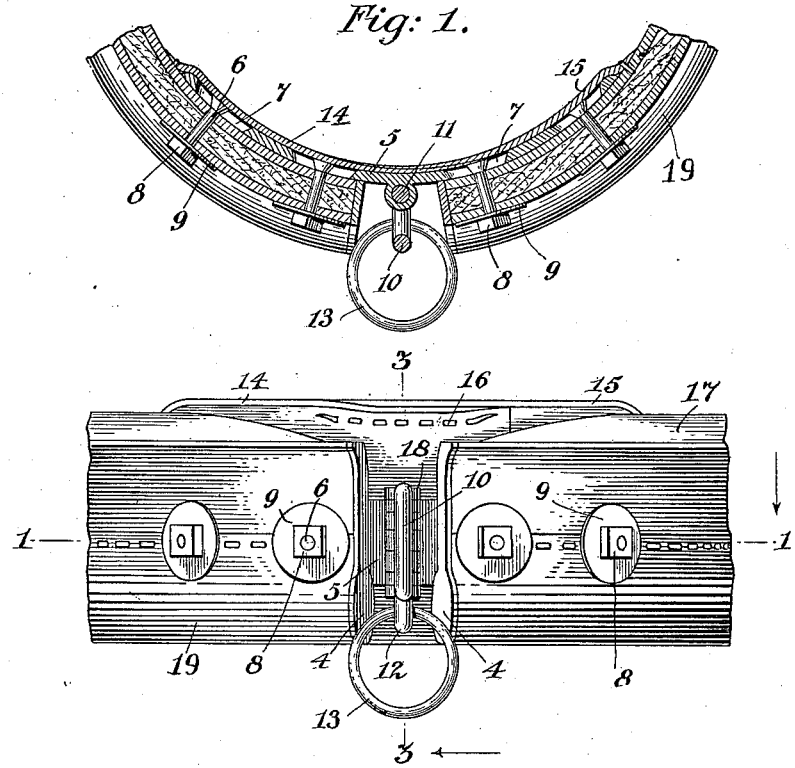
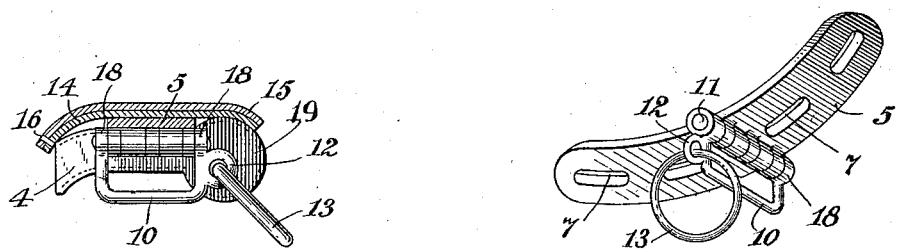
Witnesses:
Burl Vaughan.
Henry B. Taylor.
Inventor:
Cyrus C. Rose
By Lou. Vaughan,
his Attorney.
COLUMBIA PLANOGRAPH CO., WASHINGTON, D. C.

UNITED STATES PATENT OFFICE.

CYRUS C. ROSE, OF WALTHILL, NEBRASKA.

HORSE-COLLAR THROAT.

1,013,688.  Specification of Letters Patent.  Patented Jan. 2, 1912.

Application filed August 17, 1911. Serial No. 644,543.

*To all whom it may concern:*

Be it known that I, CYRUS C. ROSE, citizen of the United States of America, residing at Walthill, in the county of Thurston and State of Nebraska, have invented certain new and useful Improvements in Horse-Collar Throats, of which the following is a specification.

My invention relates to horse collars having leather cased fore and after-wales stitched together and stuffed in the usual manner; and the objects of my improvement are, first, to provide a hinged throat that in ordinary use retains the opposite halves of the collar inseparable and that will allow the opposite sides of the collar to be freely drawn in against the sides of the animal's neck by properly fitted hames, without unduly bending and disrupting the leather portions of the throat structure; second, to provide a throat adjustable in length for making the greater lateral adjustment of the sides of the collar when it is changed to necks of different thickness; third, to provide therewith a loop to retain the hame-strap and hames in the peripheral groove of the collar and also to centrally support a martingale ring at any desired lateral adjustment of the throat; and, fourth, to provide an adjustable shield to protect the metal parts and afford a closed smooth surface toward the animal's throat. All of which with other minor objects I attain by the structure illustrated in the accompanying drawing in which—

Figure 1 is a longitudinal vertical section of the collar throat on the broken line 1—1 of Fig. 2; Fig. 2, an underside view of the collar throat; Fig. 3, a central vertical transverse section on the broken line 3—3 of Fig. 2; and Fig. 4, a perspective view of the combined strap-hinge, hame-strap loop and martingale ring, in all of which like reference numerals designate the same parts.

Experience has proved that any horse-collar to do safe and comfortable service must be close fitted and retained against the sides of the animal's neck. This seems most easily attained by the ordinary pliable stuffed-leather structure within correctly shaped rigid hames. To facilitate such fitting by providing a less delicate but more easily bent and adjusted throat, I have severed and separated the throat-ends of the side halves of the collar and closed these ends by heavy leather plates 4 stitched on as shown. The leaves 5 of the strap hinge are bent longitudinally to fit the inner curvature of the throat ends of the halves of the collar along which they are centrally seated between the fore-wale 19 and the after-wale 17. These leaves have the centrally-disposed longitudinally-ranged countersunk slots 7, to receive the flat heads of the screw-bolts 6. The screw-bolts are disposed stationarily and radially through the seam of the collar between the wales and have nuts 8 on their outer ends to engage the broad washers 9 disposed in the outer groove of the collar.

A U-shaped hame-strap loop 10 has an eye 18 at the end of each leg. The pintle 11 of the hinge is made longer than required for the hinge joint and the eyes of said legs are mounted on the projecting ends of this pintle to suspend the loop through between the severed throat ends. The forward leg has the intermediately disposed forwardly projected eye 12 to carry the martingale ring 13.

The overlapping shield-plates 14 and 15 are made of leather and have their outer ends stitched to the inside of the ends of the collar halves beyond the range of the outer ends of the hinge leaves. They are of sufficient length to overlap each other at the center, as shown, at any adjustment of the throat; and have along their back edges rows of closely disposed holes to receive through both the slip thong 16, which retains them from flapping apart at this edge.

Removing the thong from the shield plates and loosening the nuts of the screw-bolts, the opposite throat ends of the collar halves may be slid along the hinge leaves to separate or bring said severed ends together at any desired adjustment, limited by the length of the slots in the leaves.

I claim:

1. A horse-collar throat, comprising centrally severed throat ends of opposite side halves of a horse-collar, a strap hinge having longitudinally bent leaves fitted to the adjacent inner bends of said throat ends and longitudinally arranged slots in said leaves, screw-bolts disposed through said slots and seated laterally through said throat ends, and shield plates having their outer ends stitched to the inner bends of said throat ends and their inner ends disposed to overlap each other centrally above the joint of the hinge.

2. A horse-collar throat, comprising severed throat ends of the side halves of a collar, a strap hinge having leaves bent longitudinally to fit the inner bend of the collar halves adjacent to the severed ends and having longitudinally arranged slots in said leaves, screw-bolts disposed stationarily through said severed ends and loosely through the slots of said hinge leaves, and a U-shaped hame-strap loop suspended between the severed ends by eyes on the ends of its legs mounted on the ends of the hinge pintle.

3. A horse-collar throat, comprising opposite severed throat ends of the side halves of a horse collar, a strap hinge having leaves bent longitudinally to seat on the upper throat curves of said ends and longitudinally arranged slots in said leaves, screw-bolts disposed radially through said slots and throat ends, a U-shaped hame-strap loop having eyes at the ends of its legs mounted on the ends of the pintle of said hinge and suspended between said severed throat ends, and oppositely disposed shield plates stitched to the inner bends of the throat ends and having their inner ends overlapping centrally above the joint of the hinge.

4. A hinge and hame-strap loop for horse-collar throats, comprising longitudinally curved leaves having longitudinal slots and hinge-jointed together endwise, a hinge-pintle longer than the hinge joint, and a U-shaped loop having the ends of its legs shaped to form eyes mounted on the projecting ends of said hinge-pintle.

In testimony whereof I have affixed my signature in presence of two witnesses.

CYRUS C. ROSE.

Witnesses:
HARRIS PRINZING,
CECIL R. BOUGHN.

---

Copies of this patent may be obtained for five cents each, by addressing the "Commissioner of Patents, Washington, D. C."